Oct. 21, 1969    E. C. SARGENT    3,473,489
CAKE PAN AND METHOD OF BAKING A LAYER CAKE
Filed Dec. 20, 1966

INVENTOR
ELIZABETH C. SARGENT
BY
Berman, Davidson & Berman
ATTORNEYS.

United States Patent Office 3,473,489
Patented Oct. 21, 1969

3,473,489
CAKE PAN AND METHOD OF BAKING
A LAYER CAKE
Elizabeth C. Sargent, 1617 Melbourne Ave.,
Melbourne, Fla. 32901
Filed Dec. 20, 1966, Ser. No. 603,332
Int. Cl. A21d 8/00, 13/08
U.S. Cl. 107—54                                   1 Claim

ABSTRACT OF THE DISCLOSURE

A baking pan formed of a flat bottom plate having a vertical upstanding boundary wall and a plurality of partitions of similar shape disposed parallel thereto within the pan. The partitions and boundary wall are integrally secured to the bottom plate and all inner surfaces are coated with Teflon. The depth of the pan is at least four-tenths the largest horizontal dimension to enable baking a complete layer cake having vertical layers, in one operation.

FIELD OF THE INVENTION

This invention relates to kitchen molds and more particularly to a mold useful for baking a complete layer cake in a single operation and as a unit with the layers disposed vertically rather than horizontally.

Conventional pans intended for the baking of layer cakes, whether in the home or in bakeries, are shallow devices capable of holding only one layer, so that each layer must be baked separately. Accordingly, a large number of pans are required, particularly in a bakery where many cakes are baked simultaneously, and they occupy a greater deal of space, both in storage and in the oven so that the number of cakes which can be baked at one time is limited by the area occupied by the numerous layer pans. Once the layers are baked, they must be stacked vertically upon one another, and this requires smoothing, of flattening, of the individual layers usually by trimming to improve the stability and appearance of the stacked layers. The trimming operation is also time-consuming.

It is a primary object of the present invention to provide a kitchen mold or cake pan so designed as to obviate the above stated disadvantages of conventional pans, and which will enable the baking of a complete layer cake as a unit with the layers disposed vertically instead of horizontally.

It is an important object of the invention to provide an improved cake pan of the above described characteristics, wherein the cake pan has a depth equal to the height of the complete layer cake, or the sum of the thickness of the various layers of a corresponding horizontal layer cake, the layers, however, being arranged vertically and formed by vertically disposed partitions in the pan spaced from one another and the boundary wall of the pan and having the same configuration as the boundary wall.

Another object of the invention is to provide a cake pan, having the above described characteristics, wherein all of said boundary and partition walls are integrally secured to the bottom wall of the pan so as to avoid the necessity for assembling the partitions with the pan prior to each baking operation.

A still further object of the invention is to provide a cake pan, having the above described characteristics, which is simple and durable in construction, inexpensive to manufacture, and one which will be very efficient and useful in operation.

Yet another object of the invention is to provide a novel method of baking a layer cake complete and as a unit.

The novel features that are considered characteristic of the invention are set forth with particularity in the appended claim. The invention, itself, however, both as to its organization and its method of operation, together with the additional objects and advantages thereof, will best be understood from the following description of a specific embodiment when read in connection with the accompanying drawing, wherein like reference characters indicate like parts throughout the several figures and in which:

Figure 1:
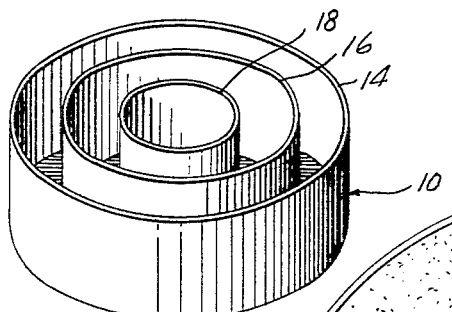
FIGURE 1 is a perspective view of a preferred embodiment of the invention.
Figure 2:
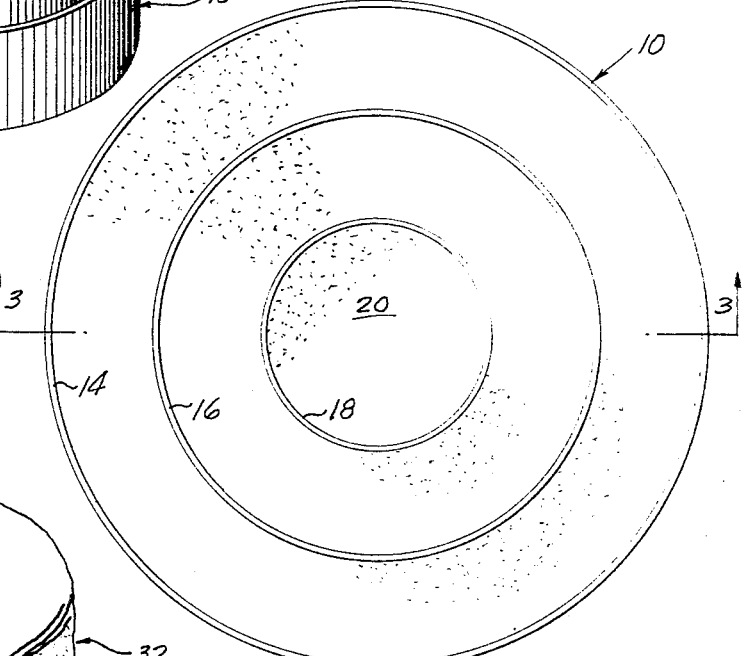
FIGURE 2 is a plan view, to an enlarged scale, of the cake pan shown in FIGURE 1.
Figure 3:
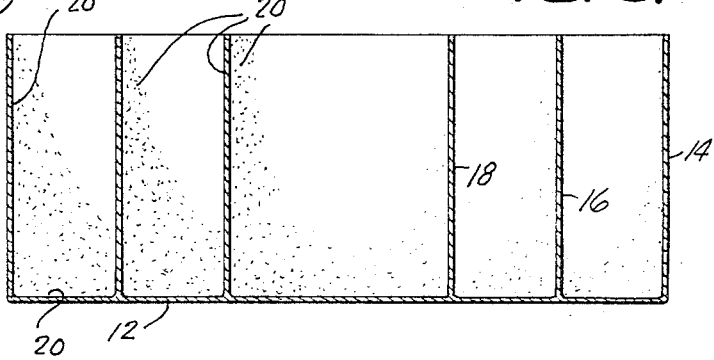
FIGURE 3 is a sectional view taken on line 3—3 of FIGURE 2 and looking in the direction of the arrows.

Referring now more particularly to the drawing, FIGURES 1–3 illustrate a preferred embodiment of the invention as comprising a circular cake pan 10 having substantial depth corresponding at least to the depth of a conventional three, or four, horizontal layer cake. The pan embodies a flat circular bottom wall 12 formed of aluminum, or other metal or material, suitable for conducting and withstanding heat up to 400° Fahrenheit and for making purposes, and having affixed thereto at its boundary an annular wall 14 formed of the same material. Preferably, the wall 14 is disposed vertically in order to obtain vertical layers in the cakes to be baked. If desired, however, said wall may be slightly conical in shape so as to flare outwardly and upwardly with distance from the bottom plate.

A plurality of partition walls 16, 18 each having the same annular shape as the boundary wall 14 are positioned within the pan coaxially with the boundary wall and substantially equally spaced from one another and the boundary wall. The partition walls and the boundary wall are then integrally secured to the upper surface of the bottom plate 12 by means of soldering, welding, sweating, or the like, in order to rigidly secure all parts of the pan together to form a unit.

The inner surfaces of the bottom and boundary walls, as well as the two opposed faces of each partition wall within the pan are coated with a thin layer 20 of Teflon, tetrafluoroethylene polymer, which prevents sticking of the batter to the walls of the pan during baking and subsequent cooling, so that the cake may be easily removed from the pan. During baking, the batter tends to shrink and move away from the partitions and other walls and this tendency also exists during cooling, so that no difficulty is encountered in removing the baked cake from the pan and the need for mounting scraping implements movable on the pan is thus avoided.

In the illustrated example, the pan has a diameter of approximately ten inches, and a depth of approximately four inches. With these proportions, a complete layer cake may be baked as a unit and will correspond in height to a conventional horizontal layer cake having three or four layers. Thus, it is emphasized that the height of the boundary and partition walls should equal at least four-tenths of the diameter of the cake pan. This provides a relatively deep pan in contradistinction to the shallow pans which are conventionally used for making layer cakes.

Obviously, the invention is not restricted to circular pans and if pans of other configurations are formed, the height of the pan and thus, of the boundary and partition walls, should be at least fourth-tenths the maximum, horizontal dimension of the bottom wall, a dimension corresponding to the diameter when the bottom wall is circular.

In use of the above described cake pan the dough or batter is poured into the pan to fill or nearly fill all of the chambers formed by the partition walls. After baking at the requisite temperature, the pan is removed from the oven and placed on a separate support for cooling. Once the cake has adequately cooled, the pan is inverted on the support and the pan may then be easily lifted therefrom, leaving the cake on the support as an outer ring 22, a central cylindrical core 24 and an intermediate ring 26 spaced apart by distances slightly larger than the thickness of partitions 16, 18. The spaces between vertical layers 24, 26 and 22, 26 are filled with frosting, icing, jellies or preserves, as indicated at 28. Also, the entire top surface of the cake, which was the bottom when in the pan, as well as the outside surface of the outer ring 22, are covered with an icing 30, which may be the same or different from that inserted between the layers. Upon cooling and hardening of the icings 28, 30 the cake will be ready to serve.

Figure 4:
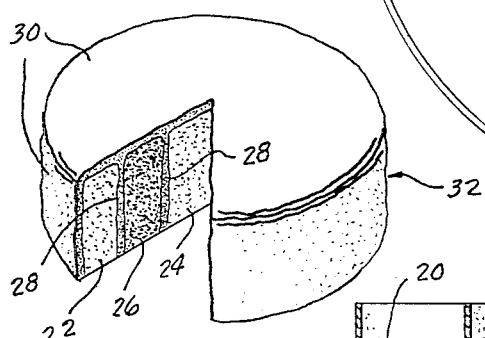
FIGURE 4 is a perspective view to reduced scale, diagrammatically showing a portion of a layer cake which has been baked in the pan shown in FIGURE 1.

It will be noted that the entire layer cake 32, shown in FIGURE 4, is baked as a unit and in only the single pan 10. The need for assembling, trimming and stacking of separate horizontal layers are thus avoided. Since only one pan is used, a number of cakes, or one layer cake together with other items, may be baked simultaneously, the horizontal space occupied by the single pan 10 being relatively small compared to the space occupied by three conventional horizontal layer cake pans. The Teflon coating on the inner surfaces of the pan avoids sticking of the batter and permits the ready removal of the cake from the pan, once the baking is done. Obviously, one who uses the pan may place batters of different constituents in the different chambers between the vertical walls 14, 16 and 18 so that each vertical layer of the finished cake may be of a different cake batter. Furthermore, these different batters may be of contrasting colors to vary and improve the appearance of the cake when it is cut. The vertical disposition of the partitions and boundary wall and the horizontal disposition of the bottom wall, together with the alignment of the upper edges of the boundary and partition walls in a horizontal plane, result in uniform vertical cake layers 22, 24, 26 having vertical sides and horizontal top and bottom faces which require no trimming and improve the appearance of the layer cake 32, FIGURE 4.

It should be apparent from the above description that the pan 10 may be used for nonbaking purposes, such as for example, a mold for forming gelatin or other products, and when thus used, will result in vertical layers of contrasting colors and materials in the finished product.

What is claimed is:
1. A method of making a complete layer cake as a unit in a single utensil, which comprises pouring batter into an open topped receptacle having vertical partitions therein secured to the bottom wall thereof, placing the receptacle in an oven and baking the batter contained therein, removing the receptacle from the oven and allowing the baked batter to cool, inverting the receptacle to empty the baked batter onto a flat support, filling the vertical spaces formerly occupied by said partitions with an icing-like material, and covering the top and outer surfaces of the baked batter with a frosting material.

References Cited
UNITED STATES PATENTS

| | | |
|---|---|---|
| 661,273 | 11/1900 | Park. |
| 1,015,892 | 1/1912 | Jefferson. |
| 1,624,941 | 4/1927 | Fulkerson. |
| 1,746,521 | 2/1930 | Broeg. |
| 2,028,671 | 1/1936 | Kollman _____ 220—22 |
| 2,081,078 | 5/1937 | Watson _____ 126—373 |
| 2,529,354 | 11/1950 | Schroeder. |
| 2,678,143 | 5/1954 | Dillingham et al. _____ 107—19 |

WALTER A. SCHEEL, Primary Examiner
ARTHUR O. HENDERSON, Assistant Examiner